United States Patent [19]

Jagermalm et al.

[11] 4,035,802
[45] July 12, 1977

[54] METHOD AND APPARATUS FOR WIND MEASUREMENT

[76] Inventors: Ove Jagermalm, Erakuja 6 B 27, 01670 Vantaa, Finland; Keijo Luukkonen, Etuniementie 6 B, 02240 Friisila, Finland

[21] Appl. No.: 652,824

[22] Filed: Jan. 27, 1976

Related U.S. Application Data

[63] Continuation-in-part of Ser. No. 458,050, April 4, 1974, abandoned.

[30] Foreign Application Priority Data

Apr. 5, 1973 Finland .................................. 731059

[51] Int. Cl.² ............................................ G01S 1/30
[52] U.S. Cl. ........................ 343/105 R; 340/189 M; 343/100 Cl
[58] Field of Search ................. 343/105 R, 100 CL; 340/189 M

[56] References Cited

U.S. PATENT DOCUMENTS

| | | | |
|---|---|---|---|
| 3,263,231 | 7/1966 | Smith et al. | 343/100 CL |
| 3,599,212 | 8/1971 | Bickel | 343/105 R |
| 3,680,115 | 7/1972 | Bickel | 343/105 R |
| 3,715,758 | 2/1973 | Sender | 343/105 R |
| 3,774,211 | 11/1973 | Nard et al. | 343/105 R |

*Primary Examiner*—Maynard R. Wilbur
*Assistant Examiner*—Richard E. Berger
*Attorney, Agent, or Firm*—Steinberg & Blake

[57] ABSTRACT

A wind measuring system utilizing a very low frequency (VLF) radio navigation system including an observation station, at least three transmitting stations for sending out the VLF signal, and a sounding device positioned in the atmosphere for receiving the VLF signals from the transmitting stations and retransmitting them by way of a telemetric link to the observation station where processing equipment measures the phases of the signal transmission and determines therefrom the position or velocity directions of the sounding device. The processing equipment includes a receiving circuit for receiving the VLF signal from the sounding device, and limiting circuitry for amplitude limiting the VLF signal. A local signal generator included in the observation station generates a reference signal which has the same frequency as the VLF signal. Polar cross correlation circuitry is also included for forming cross correlation functions of the amplitude limited VLF signals and the reference signal. The phase angles of the cross correlation functions are representative of the location of the sounding device.

18 Claims, 3 Drawing Figures

TO COMPUTER

METHOD AND APPARATUS FOR WIND MEASUREMENT

CROSS REFERENCE TO RELATED APPLICATION

This application is a continuation-in-part of application Ser. No. 458,050, filed Apr. 4, 1974 and abandoned subsequent to the filing of the present application.

BACKGROUND OF THE INVENTION

The present invention relates to wind measurement.

In particular, the present invention relates to a method and apparatus for wind measurement, wherein the position or velocity vector of a meterological sounding balloon is determined at appropriate time intervals utilizing a VLF radio navigation system.

Radio navigation systems have been known for use in wind measurement. One such type system, the very low frequency (VLF) radio navigation system, utilizes a ground station in conjunction with a sounding balloon. The sounding balloon is a free flying balloon carrying various meteorological instruments which are typically used for obtaining records of temperature, pressure and humidity in the upper atmosphere. The sounding balloon when used in the VLF navigation system also includes a radio receiver which can receive VLF signals transmitted from ground transmission stations. The VLF signals received by the sounding device are retransmitted by a telemetric link to the observation station, which then processes the signals whereby the phase of each of the VLF transmissions is measured.

Such navigation systems as have been described are typically referred to as hyperbolic navigation systems. In such systems, hyperbolic lines of position are produced by measuring the differences in time of transmission of the very low frequency radio signals from two or more synchronized transmitters located at fixed points. When such synchronized signals from the two stations are received, the difference in times of arrival at the receiver is constant on a hyperbola having the two transmitting stations as the foci. The measured time difference locates the receiver on one of the hyperbolic lines of position representing that time difference. Thus, if two transmitting stations each send out the synchronized signals, a receiver positioned so as to receive the synchronized signals will receive them at a time difference. The difference in time of reception of the two signals at the receiver is an indication of the difference in distance from the two stations. The locus of all points having the same difference is a hyperbola. The difference in phase of signals received from different transmitters can also be used to measure the difference in distance from a receiver positioned with respect to the two transmitters. In such cases, the hyperbolic lines of position represent constant phase difference lines with respect to the two transmitters. While there are many variations of the hyperbolic navigation system, one of the most common known such VLF navigations systems is the so called Omega system. In the Omega system, direct phase comparisons are made between the two transmitting stations. The system utilizes frequencies in the 10–15 kHz band. The transmissions from the stations are sequential and are followed by transmissions at frequencies slightly shifted from the first frequency.

In utilizing a VLF radio nagivation system for wind measurement, a sounding device is sent into the atmosphere. The sounding device is equipped with a radio receiver which can receive the VLF signal from the transmitting station. The signals received are then relayed to an observation station by means of a telemetric connection accomplished by use of a UHF link. Each of the transmitting stations transmits the VLF signal according to a time sharing system within the range of frequencies of 10–15 kHz. The pulse pattern of the VLF signal is identically repeated with constant time intervals between each transmission. Between the pulses there is usually a pause in order that the transmitted signal should have time to be attenuated after it is transmitted.

When utilizing two transmitting stations, the hyperbolic lines of position represent a constant phase difference. When information is received from a given receiver located with respect to the two stations, the determined phase difference will locate the receiver on a given hyperbolic line. However, two similar parts of the hyperbola exist whereby an ambiguity is present as to the exact poistion of the receiver. This ambiguity is resolved by the use of an additional station whereby the three stations form two pairs of stations. Hyperbolas are then formed between each pair of stations and a fix can be obtained at the intersection at the particular hyperbolic lines.

Position finding in the VLF system is therefore achieved by measuring the phase differences between the signals transmitted by the three stations. Between any two of these stations, there exists the hyperbolic line of positions with the two stations at its focal points. However, since generally the stations are separated by great distances, the same phase difference hyperbolic lines will be repeated at numerous points along the line connecting the two stations. Each of these points are spaced by one half the wave length. The area between two hyperbolas corresponding to a zero degree phase difference is generally referred to as a lane. By measuring the phase differences of two stations, the position of the receiver with reference to the respective lanes can be determined. However, in actual navigational use, such determination will be ambiguous since two possibilities occur on the lane. In wind measurement, however, this ambiguity of lanes does not cause any difficulty because the starting point is known. Therefore, the correct lane can be found by counting the lands which the meteoroligical sounding device has traversed since its start. As a general rule, a meteorological sounding device moves within a small enough area to allow the width of the lanes and the angle between them to be assumed to be constant.

In utilizing a VLF system for wind measurement, the accuracy of the VLF system can be improved by utilizing a differential measurement. Errors are frequently introduced as a result of faults in the propagation of the VLF signal. Such errors can be corrected by utilizing a fixed point of observation on the ground as a VLF signal receiver, in addition to the sounding device. Thus, when a signal is transmitted, the signal is simultaneously received both at the fixed point of observation on the ground as well as at the meteorological sounding device. Any such faults in propagation cause approximately equal changes of phase at both the sounding device and the ground observation point if the distance between the sites is less than about 400 km. Correction of such propagation errors can then be achieved by applying the measurements made at the fixed point of observation on the ground to the measurements made at the meteorological balloon. In this manner, phase errors introduced by propagation can be removed from the measurement made at the meteorological balloon and the phase difference at the meteorological balloon will therefore only be as a result of the position of the meteorological sounding device.

When a meteorological sounding device is observed, it is usually desired to find its position or velocity vector at one minute intervals. It is therefore possible to receive several pulses from each of the stations being utilized.

Several different VLF position finding receivers are known in the art. By way of example, such systems have been described in the following literature: J. P. van Etten, "Navigation Systems: Fundamentals of Low- And Very-Low-Frequency Systems", Electrical Communication, Vol. 45, No. 3, 1970, p. 192–212; "LO-GATE III W-3 Technical Description and System Description", Beukers Laboratories Inc.; and R. H. Woodward, J. A. Pierce, W. Palmer, and A. A. Watt, "Omega—A World-Wide Navigational System", Pickard and Burns Electronics, 1966, p. 364.

In the VLF navigation devices of the prior art, phase determination is achieved by means of a phase locked loop. This method of determining the phase has numerous drawbacks. Firstly, in order to maintain phase locking, it is necessary that the receivers obtain an extremely good signal since phase locking is difficult with poor signal to noise ratios. This problem is especially of concern in wind measurement where many signals are transmitted in the same telemetric channel which therefore introduces numerous harmonics and interfering frequencies from intermodulation. This reduces the signal to noise ratio and makes good phase locking even more difficult. Additionally, narrow band filters have to be utilized in the processing equipment and these introduce additional phase errors. The receivers utilized in the prior art systems have been extremely complex and costly because of the many requirements placed upon such receivers. Such requirements were necessary since the band widths of the phase lock loops affect the phase following capacity as well as the speed of locking. Furthermore, with prior art systems, it was not possible to measure all of the information contained in the signals, especially because of the poor signal to noise ratios which frequently occur.

SUMMARY OF THE INVENTION

It is accordingly a primary object of the present invention to provide an apparatus for wind measurement which avoids the aforementioned problems of prior art systems.

In particular, it is an object of the present invention to provide a very low frequency radio navigation system for wind measurement, wherein the phase determination is achieved by forming a cross correlation function between the VLF navigation signals and a locally generated reference signal in a ground observation station.

In particular, it is an object of the present invention to provide a method and apparatus for determining the phase differences in a VLF radio navigation system utilized for wind measurement, wherein the signal to noise ratio is maximized.

Thus, it is an object of the present invention to provide a method and apparatus of the above type which is far more accurate than previously known similar systems while at the same time being more reliable in its operation.

According to the invention, the system for wind measurement utilizes a very low frequency (VLF) radio navigation system comprising an observation station having processing means. At least three transmitting stations are available for sending out a very low frequency signals. A sounding device is positioned in the atmosphere for receiving the VLF signals from the transmitting station and retransmitting them by means of a telemetric link to the observation station whereby measurement of the phase of the VLF signal transmissions can be achieved. The processing means includes receiving means which can receive the VLF signal from the sounding device. Limiting means then act upon the received VLF signal and amplitude limit the signal. A local signal generating means generates a reference signal which has the same frequency as the VLF signal. Polar cross correlation means then forms the cross correlation functions between the amplitude limited VLF signal and the reference signals. The phase angles of the cross correlation functions is representative of the location of the sounding device, enabling path plots or velocity vectors of the meteorological sound to be calculated.

BRIEF DESCRIPTION OF DRAWINGS

The invention is illustrated by way of example in the accompanying drawings which form part of this application and in which.

DESCRIPTION OF THE PREFERRED EMBODIMENTS

Figure 1:
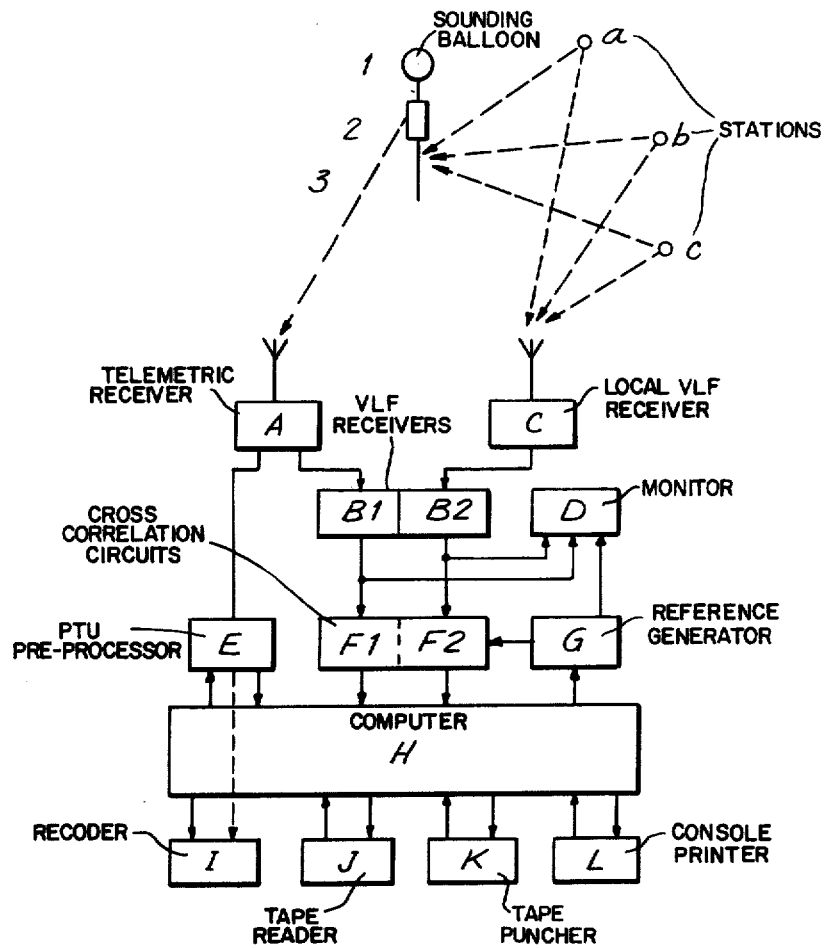
FIG. 1 is a schematic block diagram of an automatic system, in accordance with the invention, for measuring wind as well as pressure, temperature, and humidity.

Referring now to FIG. 1 there is illustrated a VLF navigation system for automatic wind measurement. Three transmitting stations $a$, $b$, and $c$ are available to transmit sequentially VLF signals at an appropriate frequency. The signals are received by an airborne sounding device 2, which contains signal-receiving equipment and is carried by a meteorological balloon. The signals are received by means of the VLF antenna 3 which typically consists of a wire approximately 3 meters long. The bandwidth of the receiver is typically 2kHz and its sensitivity is high enough to enable the antenna to develop a voltage of approximately 0.01 microvolts which produces a signal sufficient to be used. The receiver generally includes a selective amplifier with a gain of about 80dB. The signal from the amplifier modulates telemetric transmitting equipment, included within the sounding device, which operates for example in the 400 MHz range. The sounding device would also include known types of meteorological equipment for use in obtaining records of temperature, pressure and humidity all of which are of well known design. The telemetric transmitter in the sounding device would be modulated by the standard PTU (pressure, temperature, humidity) information as well as the VLF signal.

At the ground there is located an observation station which receives the signals transmitted from the sounding device. The ground observation station includes a telemetric receiver A, which operates in the same range as that at which the sounding device has modulated the signals. In the illustrated example, this would be approximately in the 400 MHz range. The signals received are led to a VLF receiver B1, wherein the VLF signal is extracted, and the signals also are received by a PTU preprocessor E, wherein the pressure, temperature and humidity information are extracted. The PTU information is then sent to the computer H, which can act upon such information in a well known manner. Information is also sent to a recorder I.

The VLF signal extracted by the receiver B is then acted upon by a cross correlation circuit F1, which forms the cross correlation with a reference signal produced by a reference generator G, such as an accurate crystal oscillator. The reference signal $r(t)$ has the same frequency as the VLF navigation signal $s(t)$. The output of the cross correlation circuit is sent to the computer H, which computes the correlation function and its phase angle. The output from the computer can be recorded on the multiple channel recorder I, or can be permanently recorded on a punched paper tape by means of the tape puncher K. A paper tape reader J is shown, providing access to the computer with taped instructions. A console printer L is also available for entering information into and receiving information from the computer. A monitor oscilloscope D is coupled to the output of the VLF extracting circuits B1 and B2 as well as the reference generator G whereby the qualities of the signals can be visually monitored.

If differential measurement is to be utilized to correct propagation errors, a local VLF receiver C is also included in the observation station for directly receiving signals from the VLF stations $a$, $b$ and $c$. The signals are then led to the VLF extracting circuit B2 which extracts the directly received VLF signal and sends it to a cross correlation circuit F2 which forms the cross correlation function between the directly received VLF signal and the reference signal from the reference generator G. The computer H will then utilize the cross correlation function formed in conjunction with the directly received VLF signal to remove the propagation errors, and the phase errors introduced therefrom, from the cross correlation function produced in conjunction with the VLF signal received from the sounding device. Thus, the phase difference which is ultimately determined from the sounding device will only reflect the position of the sounding device and will not reflect propagation errors from the transmitting station of the VLF signal. Although two cross correlation circuits F1, F2 are shown, it is understood that one such cross correlation circuit could be utilized or alternately forming the cross correlation function from the VLF received from the sounding device and from the VLF signal received directly from the transmitting station.

The cross correlation function is defined by the well known equation:

$$\psi_n = \int_o^T f(t)\, g\,(t+\tau) dt$$

Figure 2:
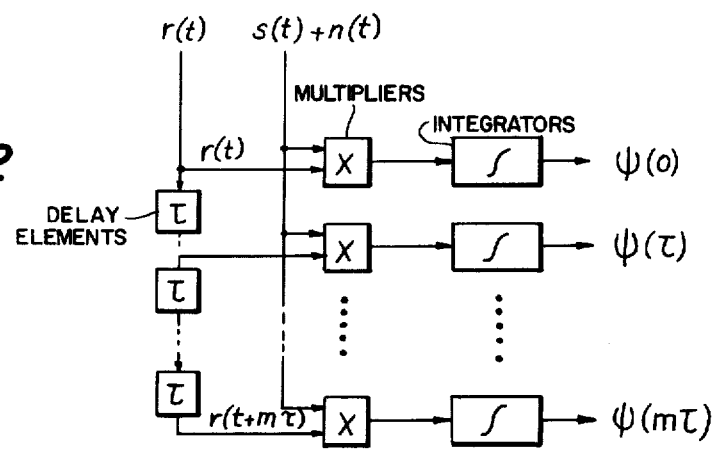
FIG. 2 is a schematic block diagram of a cross correlation circuit.

FIG. 2 illustrates a schematic block diagram showing the principle of carrying out the cross correlation function between $s(t)$ and $r(t)$. The VLF signal $s(t)$, together with noise $n(t)$, arrives at the ground observation station. The signal $s(t) + n(t)$ can represent either the VLF signal received from the sounding device or the VLF signal directly received from the transmitting station. This signal is filtered by means of a band pass filter. Reference signal $r(t)$ is passed through a series of delay elements $(\tau)$ each of which introduce a fixed delay to the signal $r(t)$. In this manner, the phase of the signal $r(t)$ can be changed. The signals $r(t)$ are thus delayed by the time $k\tau$ whereas $k=0 \ldots m$. The outputs from each of the delays are then sent to individual multipliers $x$ each of which also receive the signal $s(t) + n(t)$. In this manner, the VLF signal $s(t) + n(t)$ is multiplied by successively delayed reference signals. The outputs of each of the multipliers are integrated by means of the integrators $\int$ whereby individual values $\psi(k\,\tau)$ of the cross correlation function are obtained. The different values $\psi(k\,\tau)$ represent samplings of the values of the cross correlation function $\psi$ for a number $(m+1)$ of points, wherein $m$ represents the number of individual delays.

The correlator represented by FIG. 2 is called a polar cross correlator when the signals $r(t)$ and $s(t) + n(t)$ are hard-clipped (digital), multipliers X are digital coincidence gates (giving true output when both inputs are of the same polarity) and integrators $\int$ are digital integrators (counters, which are incremented by the sampling clock pulses when the multiplier output is true). The polar cross correlator has the following features:

If the signal to noise ratio is $>>1$, the cross correlation function of the received, sinusoidal limited signal $s(t)$ and the reference $r(t)$ is a triangular function having the amplitude 1. It can further be shown that in the case of a signal to noise ratio $<<1$, in spite of the limiting, as a result of true correlation function, multiplied by a certain constant, is obtained. By combining each of the sampled values $\psi(k\,\tau)$, the cross correlation function itself would be obtained.

Figure 3:
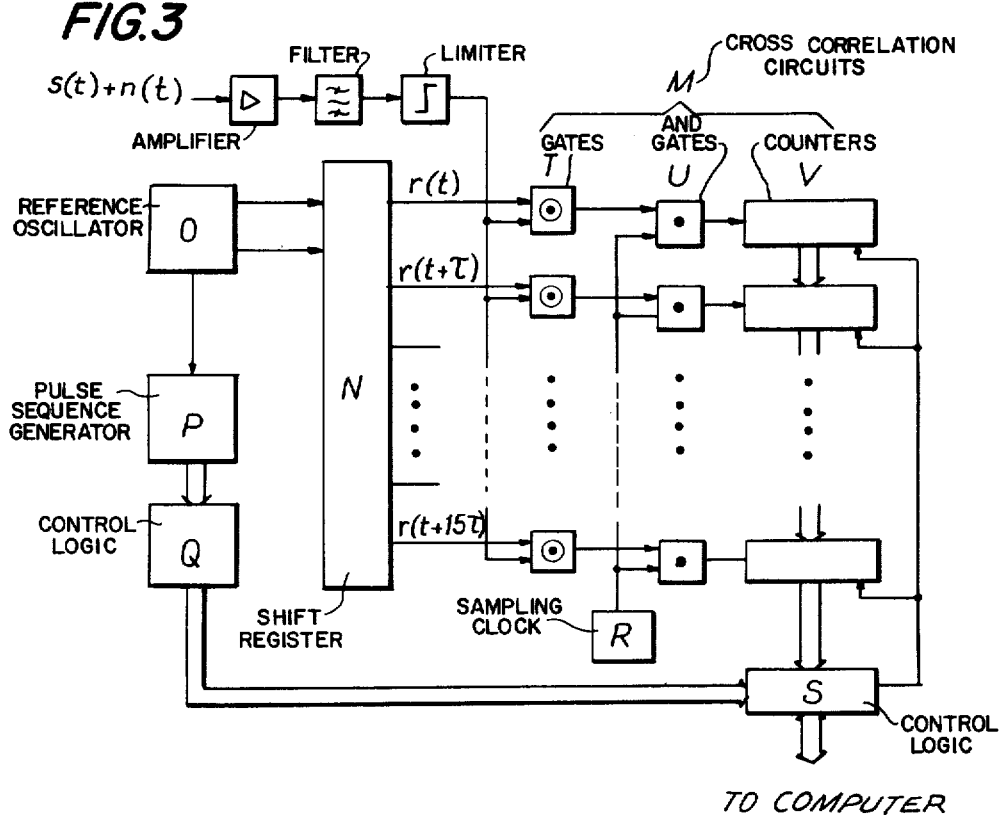
FIG. 3 is a schematic block diagram of a VLF polar cross correlation circuit according to this invention.

Referring now to FIG. 3, there is shown a schematic block diagram of the polar cross correlator used in conjunction with the present invention. By way of example, this schematic diagram will be explained in connection with the Omega type of VLF navigations system. The polar cross correlator shown in this example has 16 channels. The input to the cross correlator $s(t) + n(t)$ can be from either the VLF signal received from the sounding device or the VLF signal directly received from the transmitting station. The signal is then amplified by means of the amplifier shown at the upper left of FIG. 3, and is subsequently filtered to effectively extract only the VLF signal $s(t)$. This signal is then limited by means of the limiter to levels which can be used for subsequent logic devices. This would generally form a binary signal.

A reference oscillator O generates a rectangular wave which has the frequency of the VLF signal received. The reference oscillator also generates clock pulses which control the shift register N. The reference signal $r(t)$ is entered into the shift register and by control of the clock pulses the shift register produces a sequence of delayed reference signals $r(t+k\tau)$, wherein $k=0 \ldots 15$, corresponding to different $\tau$ values, are obtained. The successively delayed sequences of reference signals are sent to polar cross correlation circuit M which includes gates and counters. Coincidence gates T act as multipliers for hard-clipped VLF signals $s(t)+n(t)$ and the differently phased reference signals $r(t+k\,\tau)$. The outputs of the coincidence gates are sampled in the AND gates U by the clock pulses generated in the sampling clock R. The sampling clock pulses from the AND gates U are integrated by counters V. Each counter V used as the integrator is formed, by way of example, by four bit stepping counters of which four such stepping counters are used per channel to obtain a total of 16 bit counters per channel.

When a pulse of a desired transmitting station begins, control logic Q operates to open the gate at the clock input of the counters, whereby in each one of the counters a value of the correlation function corresponding to one value of $\tau$ is formed. Upon completion of the pulse transmitted from one station, the gates are closed and the contents of the counters are then transmitted to the computer H by means of the interface control logic S.

The frequency of the reference oscillator O may be chosen, as for example, to be 6120kHz. From this value all three Omega frequencies can be obtained by division. Furthermore the clock pulses for the shift register N can also be obtained by dividing down this frequency to produce the differently phased reference signals $r(t+k\tau)$. The frequency of the clock pulses is chosen so that the spacing of the individual values of the correlation function is equally distributed over the total period. Thus in the example given, the values would each represent 1/15 of the total period. By distribution equally over a total period, the sinusoidal correlation function has two zero points. The phase angle of the correlation function represents the phase difference between the Omega signal $s(t)$ and the reference signal $r(t)$.

A pulse sequence generator P operates under control of the reference oscillator and produces gating signals for the control logic Q. The gating signals correspond to the various transmission stations which are being operated. The signals are manually synchronized with the transmitted pulse sequence from each of the transmitting stations. Such synchronization can be achieved by increasing or decreasing the frequency of the clock signals until the gating signals generated by the pulse sequence generator P have the same sequence as the transmitting station which is to be selected.

The output from the counters V will be a series of values representing the correlation function at a number of points corresponding to the number of channels. These values are sent to the computer H (shown in FIG. 1) which may be a miniature computer used to compute the correlation function which best fits the particular values of the cross correlation function measured. The computer can also compute the phase angle of the cross correlation function. When the cross correlation function in conjunction with the directly received VLF signal is formed, the computer can utilize this correction cross correlation function to eliminate the propagation errors from the cross correlation function produced in conjunction with the VLF signal received from the sounding device. The cross correlation function can be formed with signals received from three or more VLF stations each of which is compared with the same reference signal $r(t)$ whereby the phase differences between the signals from each of the stations can also be computed.

The particular values of the correlation function are read into the memory of the computer at short time intervals, as for example 10 ms, whereby the development of the correlation function can be continuously observed and the quality of the signal received can be monitored. The quality of such signals can easily be observed since the amplitude of the correlation function is proportional to the signal to noise ratio. Thus, through the cross correlation circuitry computer H continuously measures the incoming VLF signal, specifically its phase compared with reference signal $r(t)$. The period of integration applied during the calculation of the correlation function is limited to the duration of the VLF signals for one transmission sequence.

Tests results obtained in simulated runs with a computer and in laboratory measurement have generally been in agreement. Furthermore, it has been found that the attenuation of a noise signal of 300 Hz bandwidth during an integration period of 1 second is approximately 1,000. It therefore follows that the polar correlation circuitry corresponds to a filter having a bandwidth of about 1Hz which does not attenuate a signal at its central frequency. With a signal to noise ratio as extreme as $-20$dB, the correlation function could still be produced under laboratory conditions. The impairment of the signal to noise ratio, however, does reduce the amplitude of the correlation function. Nevertheless, this does not have any significant effect upon the apparatus and method since the phase differences, which are of primary importance, are determined from the phase angle of the correlation function and are not affected by the amplitude of the correlation function.

The polar cross correlation receiver which is utilized in the present invention is in effect an optimum type receiver. It can be demonstrated that in this type of receiver the signal to noise ratio in the output is maximized at the maximum of the correlation function. The polar cross correlation circuit has specifically been chosen for the present invention since it is simple in construction and at typical signal to noise ratios in the VLF range it closely approximates an ideal correlator. Furthermore, in the determination of the phase, the correct shape of the correlation function has no significance.

What is claimed is:

1. In a wind measurement apparatus, utilizing a VLF radio navigation system comprising an observation station having processing means, at least three transmitting stations for sending VLF signals, and a sounding device positioned for receiving the VLF signals from the transmitting stations and retransmitting them by means of a telemetric link to said observation station for measurement of the phases of the VLF signal transmissions, said processing means comprising receiving means for receiving said VLF signals from said sounding device, limiting means coupled to said receiving means for amplitude limiting the VLF signals, signal generating means for generating a reference signal having the same frequency as the VLF signals, and polar cross correlation means for participating in the formation of a cross correlation function between said amplitude limited VLF signals and said reference signal, wherein phase angles of said cross correlation functions are representative of the position of the sounding device.

2. The combination of claim 1 and further comprising computer means for receiving the output of said polar cross correlation means and forming therefrom said cross correlation functions, and for computing therefrom said phase angles of said cross correlation functions.

3. The combination of claim 1 and wherein said observation station further includes ground VLF receiving means for receiving the VLF signals directly from the transmitting stations wherein said processing means forms correction cross correlation functions between said directly received VLF signals and said reference signal, and further comprising means for correcting the error caused by propagating conditions by comparing said correction cross correlation functions with said first-mentioned cross correlation functions.

4. The combination of claim 1 and wherein said limiting means further comprises, in series circuit combination, amplifying means, filtering means, and amplitude limiting means, whereby the received VLF signal from the sounding device is transformed into a digital signal.

5. The combination of claim 4 and wherein said generating means comprises a reference oscillator means for forming a rectangular wave signal having the same frequency as the VLF signals, and for forming clock pulses, said polar cross correlation means comprises a shift register under control of said clock pulses for receiving said rectangular wave signal and providing successively delayed sequences of said rectangular wave signal, wherein said polar cross correlation means further comprises a plurality of gating means receiving said digital signal and each gating means respectively receiving one of said successively delayed sequences of rectangular wave signals, and further comprising a corresponding plurality of counting means for respectively receiving the outputs of said plurality of gating means.

6. The combination of claim 5 and wherein there are a plurality of transmitting stations each producing a VLF signal of a different phase, and wherein said processing means further comprises control means for controlling the operation of said gating means and for selecting the desired stations.

7. The combination of claim 6 and further comprising sequence generator means coupled between said reference oscillator means and said control means for receiving said clock pulses and for varying the frequency thereof until the sequence of the clock pulses are synchronized with the sequence of the VLF signals of the desired stations.

8. The combination of claim 5 and further comprising sampling means coupled to said plurality of counting means.

9. The combination of claim 5 and further comprising readout means coupled to said plurality of counting means for recording the cross correlation function.

10. The combination of claim 5 and wherein said successively delayed sequences respectively represent differently phased reference signals, and wherein the phases thereof are equally distributed over the total period of the rectangular wave signal.

11. The combination of claim 2 and further comprising monitor means coupled to said computer means and wherein said cross correlation functions are read into said computer means at fixed intervals, whereby the development of the cross correlation function can be observed on said monitor means and the quality of the received VLF signals can be thereby monitored.

12. The combination of claim 1 and wherein a period of integration used in the formation of the cross correlation function with regard to one transmission sequence is the same as the duration of a VLF signal.

13. A method for wind measurement utilizing a VLF radio navigation system including an observation station, at least three transmitting stations and a sounding device, said method comprising the steps of:

a. transmitting VLF signals from said transmitting stations;
b. receiving said VLF signals at said sounding device and retransmitting them to said observation station;
c. receiving said VLF signals from said sounding device at said observation station;
d. amplitude limiting said VLF signals received at said observation station;
e. generating at said observation station a reference signal having the same frequency as the VLF signals;
f. forming at said observation station cross correlation functions between said amplitude-limited VLF signals and said reference signal; and
g. determining the phase angles of said cross correlation functions.

14. The method of claim 13 and further comprising the steps of:

a. directly receiving at said observation station the VLF signals from said transmitting stations;
b. forming correction cross correlation functions between said directly received VLF signals and said reference signal; and
c. correcting said cross correlation functions between said amplitude-limited VLF signal and reference signal for errors caused by propagating conditions, by combining therewith said correction cross correlation functions.

15. The method of claim 13 and wherein said step of forming the cross correlation functions further comprises the steps of:

a. forming a plurality of correlation coefficients of differently phased reference signals, respectively, the phases of which are equally distributed over the total period of the reference signal; and
b. obtaining the cross correlation function from said plurality of correlation coefficients.

16. The method of claim 15, wherein the observation station includes a computer and further comprising steps of reading the cross correlation function values into the computer at appropriate intervals and monitoring the development of the cross correlation functions whereby the quality of the received VLF signals can be monitored.

17. The method as in claim 13, wherein a period of integration used in the calculation of the cross correlation function with regard to one transmission sequence is the same as the duration of the VLF signal.

18. In combination, a wind measuring apparatus utilizing a VLF radio navigation system comprising at least three transmitting stations for sending out VLF signals, a sounding device positioned for receiving the VLF signals from the transmitting stations and retransmitting them by means of a telemetric link, a ground observation station for measuring phases of the VLF signal transmissions, said ground observation station including receiving means for receiving said VLF signals from said sounding device, limiting means coupled to said receiving means for amplitude limiting the VLF signals, signal generating means for generating a reference signal having the same frequency as the VLF signal, and polar cross correlation means for forming a cross correlation function between said amplitude-limited VLF signals and said reference signal, wherein the phase angles of said cross correlation functions are representative of the position of the sounding device.

* * * * *